United States Patent

Jackson, Jr. et al.

[15] 3,670,489
[45] June 20, 1972

[54] TEXTILE YARN

[72] Inventors: Winston J. Jackson, Jr.; Marshall T. Watson, both of Kingsport, Tenn.

[73] Assignee: Eastman Kodak Company, Rochester, N.Y.

[22] Filed: July 28, 1969

[21] Appl. No.: 845,549

[52] U.S. Cl. ................................................57/140, 260/75
[51] Int. Cl. ..................D02j 3/02, C08g 17/015, D01d 7/04
[58] Field of Search ..............................57/140; 260/75; 28/1

[56] References Cited

UNITED STATES PATENTS

| | | | |
|---|---|---|---|
| 2,589,687 | 3/1952 | Flory et al. | 260/75 |
| 2,594,144 | 4/1952 | Flory et al. | 260/75 |
| 2,973,332 | 2/1961 | Fickentscher et al. | 260/75 UX |
| 2,973,339 | 2/1961 | Muenster et al. | 260/75 X |
| 3,013,914 | 12/1961 | Willard | 260/75 X |
| 3,025,266 | 3/1962 | Huffman | 260/75 |
| 2,503,251 | 4/1950 | Edwards et al. | 260/75 UX |
| 2,533,455 | 12/1950 | Hagemeyer | 260/75 UX |
| 2,534,028 | 12/1950 | Izard | 260/75 |
| 3,350,488 | 10/1967 | Breen | 57/140 X |
| 3,409,597 | 11/1968 | Cislak | 57/140 X |
| 3,448,087 | 6/1969 | Ballentine et al. | 57/140 X |
| 3,523,923 | 8/1970 | Smith et al. | 260/675 |

*Primary Examiner*—Donald E. Watkins
*Attorney*—William P. Heath, Jr. and Cecil D. Quillen, Jr.

[57] ABSTRACT

Textile yarn comprising oriented, crystalline fibers of poly(tetramethylene terephthalate) characterized by an improved combination of properties including a liveliness index of at least 0.25, and a toughness of at least 0.50 g./denier. Also disclosed is crimped staple textile fiber comprising oriented, crystalline, poly(tetramethylene terephthalate) characterized by a liveliness index of at least 0.25 and crush recovery greater than 50 percent.

23 Claims, No Drawings

TEXTILE YARN

This invention relates to textile yarns comprising oriented, crystalline poly(tetramethylene terephthalate) fibers, the yarn being characterized by an improved combination of toughness, liveliness, and resilience properties. This invention also relates to crimped staple fibers comprising oriented, crystalline poly(tetramethylene terephthalate) which are characterized by a high liveliness index and high staple crush recovery properties.

Prior art polyester yarns useful in textile applications for pile fabrics such as carpets and fur fabrics have been made from poly(ethylene terephthalate) and poly(1,4-cyclohexylenedimethylene terephthalate) fibers. However, these fibers, particularly, poly(ethylene terephthalate), are limited in resilience or crush resistance properties. In other applications as well as carpets, better toughness, recovery properties and degree of liveliness heretofore unattained are very desirable.

U.S. Pat. No. 2,465,319 describes the preparation of poly(tetramethylene terephthalate) and broadly sets forth that the polymer could be melt spun to give fibers possessing good cold drawing properties. Example 13 of this patent describes in some detail the particular poly(tetramethylene terephthalate). However, when the procedure set forth in Example 13 was duplicated, the resulting fiber had an inherent viscosity of only 0.34. Fibers prepared from the polymer have very low toughness.

*The Journal of Polymer Science*, Part A-1, 4, P. 1851, (1966) is the only reference that applicants have found which actually discloses any properties for poly(tetramethylene terephthalate) fibers. In this reference a poly(tetramethylene terephthalate) fiber is disclosed which has a tenacity of 3.4 g./denier, elongation of 26 percent, modulus 20 g./denier, flow point 214° C. The toughness of this fiber, [(tenacity × elongation) 200], is 0.44 g./denier. The flow point of 214° C. indicates that the maximum inherent viscosity of the fiber was about 0.65.

The poly(tetramethylene terephthalate) of this invention is conventionally prepared, such as by ester interchange of 1,4-butanediol and a dialkyl ester of terephthalic acid or by esterification of terephthalic acid with 1,4-butanediol; conventional catalysts are employed, such as tetraisopropyl titanate. Polymerization temperatures preferably are 240°–260° C.

The poly(tetramethylene terephthalate) may be modified with up to 15 mole percent of a second dicarboxylic acid containing from three to 20 carbon atoms. Preferred acids are isophthalic acid, adipic acid, azelaic acid, and 1,12-dodecanedicarboxylic acid. The poly(tetramethylene terephthalate) also may be modified with up to 15 mole percent of a second glycol containing from two to 20 carbon atoms. Preferred glycols are ethylene glycol, neopentyl glycol and 1,4-cyclohexanedimethanol. One desirable modification is with up to 15 mole percent of a dicarboxylic acid or glycol which has attached thereto a group such as —$SO_3Na$, which confers on the fiber the ability to be dyed with cationic dyes.

The expression "fiber" as used in this specification is intended to include continuous filaments and staple length fibers.

The polyester fibers of this invention may contain nucleating agents, pigments, delusterants, antioxidants, stabilizers, optical brighteners, fire-retardant agents, or other conventional additives.

The practice of this invention involves the extrusion or spinning of the fibers by conventional means, the orienting of the fibers by drafting, and heatsetting the fibers while held at constant length or while allowed to shrink.

The textile yarn of this invention is characterized by an improved combination of properties including liveliness, resilience, and toughness. Heretofore polyester textile yarns having the novel combination of properties of the yarns of this invention were unknown. The textile yarns of this invention comprise oriented, crystalline poly(tetramethylene terephthalate) fibers having a toughness of at least 0.50 g./denier and a liveliness index of at least 0.25. A preferred yarn of this invention comprises oriented, crystalline poly(tetramethylene terephthalate) fibers having a toughness of at least 0.60 g./denier and a liveliness index of at least 0.30. The fibers of this invention are further characterized in that they are dyeable with disperse dyes without a dye carrier.

The crimped staple textile fiber of this invention is characterized by a liveliness index of greater than 0.25 and crush recovery greater than 50 percent. This fiber is useful for blending with cotton to make yarn for shirting fabrics. The combination of liveliness index and crush recovery of these novel fibers imparts desirable properties to the fabrics made from yarns comprising the fibers of this invention.

Surprisingly, as shown in Example 1–12 following, poly(tetramethylene terephthalate) fibers when drawn at approximately constant draw tensions show increasing tenacity, elongation, and toughness as the inherent viscosity increases from about 0.50 to about 1.0, whereas all of our prior experience had led us to believe that polyester fibers do not show simultaneously increased tenacity, elongation and toughness properties after the inherent viscosity reaches about 0.60 to 0.70.

Fiber toughness is the area under the stress-strain curve. Since this area approximates a triangle, a satisfactory approximation of the fiber toughness is the product of (½) (tenacity in g./denier) (elongation in percent/100). Both this calculated toughness and the measured toughness are given in several of the examples. As stated earlier herein it is unexpected that the toughness of polyester fibers continues to increase as the inherent viscosity increases to about 1.0.

The inherent viscosities (I.V.) are determined at 25° C. in 60/40 phenol/tetrachloroethane at a concentration of 0.23 g./100 ml.

The fiber tensile properties are determined on an Instron tensile tester by means known to workers in the field of fiber testing. The elastic modulus is determined from the stress-strain curve by measurement of the slope of the initial straight line portion of the curve.

We have found that the degree of crystallinity (determined with X-ray diffraction patterns) of the fibers of this invention decreases as the fiber's inherent viscosity increases. Consequently, it is surprising that the flow points increase as the fiber's inherent viscosity increases to about 0.9.

The flow point is the temperature at which the fiber pulls apart under a load of 0.2 g./denier when heated on a polished, stainless steel bar.

The liveliness index is a measure of the liveliness of the fiber — the more lively the fiber the higher the index. The liveliness index is determined by stretching the fiber 5 percent at a rate of 10 percent of the initial fiber length per minute and then allowing the fiber to return at the same rate while the stress-strain curve is plotted on an automatic recorder. The liveliness index is the ratio of the square root of the elastic modulus ($E_t$) to secant recovery modulus ($E_r$):

$$\text{Liveliness Index} = \sqrt{E_t} / E_r$$

The basis for the liveliness index is the work of Hoffman and Beste, *Textile Research Journal*, 21, 66 (1951), who reported that fabric liveliness is related to the square root of fabric stiffness. Since the principal fiber property responsible for fiber stiffness is elastic modulus, this parameter was used in determining the fiber liveliness index. Since Hoffman and Beste reported that fabric springiness, a component of liveliness, is related to the recovery modulus of the fabric, we used the recovery modulus of the fiber as well, in our computation of fiber liveliness.

The combination of properties of our novel fiber is unknown in the prior art. For example, with poly(ethylene terephthalate) fiber the liveliness index is affected by the polymer inherent viscosity, spinning conditions, draw ratio, and heat-setting temperature. By experimentation through a wide range of conditions we found that the liveliness index for poly(ethylene terephthalate) fiber varies from 0.14 to 0.28.

The higher values, however, are always associated with low toughness. Poly(ethylene terephthalate) fiber having a liveliness index of 0.28 had a tenacity of 0.30 g./denier and elongation of 6 percent. Calculating the toughness (by the formula set forth earlier herein) we find that the poly(ethylene terephthalate) fiber described above would have a calculated toughness of 0.009 g./denier. Poly(ethylene terephthalate) fiber having a liveliness index of 0.14 had a tenacity of 5.2 g./denier and elongation of 23 percent; thus the calculated toughness would be 0.60 g./denier.

We have found that the novel fibers of this invention give to us both a high liveliness index and a high toughness, the values being set forth in the examples.

Another aspect of our invention is the use of poly(tetramethylene terephthalate) fibers in the form of crimped staple fibers. Compared to poly(ethylene terephthalate) fibers our poly(tetramethylene terephthalate) fibers exhibit significant improvement in staple crush recovery. It was totally unexpected that the poly(tetramethylene terephthalate) fibers could be made which would have a combination of high toughness, a high liveliness index and high staple crush recovery. We have found the prior art to be devoid of any suggestion that poly(tetramethylene terephthalate) fibers could be made which would result in the novel combination of properties which are superior to these same properties of poly(ethylene terephthalate) fiber.

The staple crush recovery test is a measure of the ability of the staple fibers to recover from crushing, and is useful for assuring the performance for applications such as carpets and pillows. Our test is a modification of the test described in *Textile Research Journal*, 23, 84(1953).

To determine the staple crush recovery, five 1.2-gram specimens from a sample of hand-carded carpet fiber — 4 to 6-inch crimped staple — are weighed to the nearest milligram, shaped into a homogeneous wad, and inserted in cylindrical vials. The vials are placed one at a time in a jig on the Instron and the sample is compressed to a pressure of 3 psi by the piston moving at a rate of 2 inches per minute. For the high pressure compression, the samples are removed from the vials one at a time and inserted in a steel cylinder with the bottom plug in place, the piston is inserted on top of the sample, and the assembly is placed in a manually-operated hydraulic press. Pressure of 5,000 psi is applied to the sample (3,895 pounds on the 1-inch diameter piston) and maintained for 1 minute by pumping as necessary. At the end of the minute, the pressure is released, the cylinder removed from the press, and the sample pushed from the bore. The sample is now in the form of a short cylindrical plug or button. This plug is replaced in its vial and set aside for overnight recovery. The slightly larger diameter of the vial compared with the bore of the cylinder allows recovery essentially without frictional restraint. Although measurements on a number of fibers showed recovery to be complete — within the limits of accuracy of the test — in 2 to 3 hours, the overnight recovery period was adopted for convenience in testing large numbers of samples. The next day the vial containing the sample is again placed in the Instron and the sample is compressed as before to a pressure of 3 psi. The ratio of this sample height to the original sample height, multiplied by 100, is the staple crush recovery.

The crimped staple fibers of poly(tetramethylene terephthalate) may be 0.25 to 12 inches in length and 1 to 100 denier per filament. The shorter lengths (0.25 to 0.5 inch) may be used as flock to impart a velvet-type surface. Lengths of about 1.5 inches may be used in cotton blends and lengths of about 4.0 to 6 inches in wool blends or carpets. Lengths of about 3 to 4.0 inches are useful as fiberfill. Certain specialty applications may require staple up to 12 inches long. The application also helps to determine the fiber denier. The denier per filament may be as low as 1 for certain specialty applications (such as silk-like fabrics) or as high as 100 for other specialty applications, e.g., doll hair. Deniers of 1.5 to 3 are useful in shirting, 3 to 25 in fiberfill, and 6 to 18 in carpets.

This invention will be further illustrated by the following examples of preferred embodiments, although it will be understood that these examples are included merely for purposes of illustration and are not intended to limit the scope of the invention.

Example 1

Poly(tetramethylene terephthalate) polymer having an inherent viscosity of 0.55 was melt spun at 230° C. into fibers. The fibers were drafted in superheated steam at 130° C. with a draw ratio of 4.1 (the maximum which could be attained without breaking the fiber) with a draw tension of 0.43 g./denier. The fibers were then heatset for 5 minutes at 145° C. while in a relaxed state. The fibers had the following properties:

| | |
|---|---|
| Inherent viscosity of fiber | 0.53 |
| Denier per fiber | 15.4 |
| Tenacity, g./denier | 2.1 |
| Elongation, % | 25.0 |
| Toughness, g./denier: | |
| Calculated | 0.26 |
| Measured | 0.28 |
| Elastic modulus g./denier | 21.0 |
| Flow point, °C. | 208.0 |
| Liveliness index | 0.37 |

Example 2

Poly(tetramethylene terephthalate) polymer having an inherent viscosity of 0.66 was melt spun at 245° C. into fibers. The fibers were drafted in superheated steam at 130° C. with a draw ratio of 4.8 and a draw tension of 1.06 g./denier. The fibers were then heatset for 5 minutes at 145° C. while in a relaxed state. The fibers had the following properties:

| | |
|---|---|
| Inherent viscosity of fiber | 0.64 |
| Denier per fiber | 14.2 |
| Tenacity, g./denier | 2.9 |
| Elongation, % | 30.0 |
| Toughness, g./denier: | |
| Calculated | 0.44 |
| Measured | 0.44 |
| Elastic modulus, g./denier | 20.0 |
| Flow point, °C. | 212.0 |
| Liveliness index | 0.37 |

Example 3

Poly(tetramethylene terephthalate) polymer having an inherent viscosity of 0.71 was melt spun at 228° C. into fibers. The fibers were drafted in superheated steam at 130° C. with a draw ratio of 4.7 and a draw tension of 0.96 g./denier. The fibers were then heatset for 5 minutes at 145° C. while in a relaxed state. The fibers had the following properties:

| | |
|---|---|
| Inherent viscosity of fiber | 0.65 |
| Denier per fiber | 16.3 |
| Tenacity, g./denier | 2.2 |
| Elongation, % | 27.0 |
| Toughness, g./denier: | |
| Calculated | 0.30 |
| Measured | 0.33 |
| Elastic modulus, g./denier | 21.0 |
| Flow point, °C. | 214.0 |
| Liveliness index | 0.37 |

Example 4

Poly(tetramethylene terephthalate) polymer having an inherent viscosity of 0.82 was melt spun at 260° C. into fibers. The fibers were drafted in superheated steam at 130° C. with a draw ratio of 4.8 and a draw tension of 1.00 g./denier. The fibers were then heatset for 5 minutes at 145° C. while in a relaxed state. The fibers had the following properties:

| | |
|---|---|
| Inherent viscosity of fiber | 0.79 |
| Denier per fiber | 15.3 |
| Tenacity, g./denier | 3.0 |
| Elongation, % | 40.0 |
| Toughness, g./denier | |
| Calculated | 0.60 |
| Measured | 0.69 |
| Elastic modulus, g./denier | 21.0 |
| Flow point, °C. | 222.0 |
| Liveliness index | 0.35 |

Example 5

Poly(tetramethylene terephthalate) polymer having an inherent viscosity of 0.95 was melt spun at 260° C. into fibers. The fibers were drafted in superheated steam at 130° C. with a draw ratio of 4.6 and a draw tension of 1.00 g./denier. The fibers were then heatset for 5 minutes at 145° C. while in a relaxed state. The fibers had the following properties:

| | |
|---|---|
| Inherent viscosity of fiber | 0.90 |
| Denier per fiber | 14.8 |
| Tenacity, g./denier | 3.5 |
| Elongation, % | 36.0 |
| Toughness, g./denier: | |
| Calculated | 0.63 |
| Measured | 0.67 |
| Elastic modulus, g./denier | 22.0 |
| Flow point, °C. | 221.0 |
| Liveliness index | 0.36 |

Example 6

Poly(tetramethylene terephthalate) polymer having an inherent viscosity of 1.10 was melt spun at 280° C. into fibers. The fibers were drafted in superheated steam at 130° C. with a draw ratio of 4.5 and a draw tension of 1.12 g./denier. The fibers were then heatset for 5 minutes at 145° C. while in a relaxed state. The fibers had the following properties:

| | |
|---|---|
| Inherent viscosity of fiber | 0.97 |
| Denier per fiber | 14.2 |
| Tenacity, g./denier | 3.9 |
| Elongation, % | 43.0 |
| Toughness, g./denier: | |
| Calculated | 0.84 |
| Measured | 0.81 |
| Elastic modulus, g./denier | 20.0 |
| Flow point, °C. | 224.0 |
| Liveliness index | 0.36 |

Example 7

Poly(tetramethylene terephthalate) polymer having an inherent viscosity of 0.55 was melt spun at 230° C. into fibers. The fibers were drafted in superheated steam at 130° C. with a draw ratio of 4.3 (the maximum which could be attained without breaking the fiber) with a draw tension of 1.13 g./denier. The fibers were then heatset for 5 minutes at 145° C. while in a relaxed state. The fibers had the following properties:

| | |
|---|---|
| Inherent viscosity of fiber | 0.53 |
| Denier per fiber | 6.1 |
| Tenacity, g./denier | 2.6 |
| Elongation, % | 27.0 |
| Toughness, g./denier: | |
| Calculated | 0.35 |
| Elastic modulus, g./denier | 22.0 |
| Flow point, °C. | 206.0 |
| Liveliness index | 0.37 |

Example 8

Poly(tetramethylene terephthalate) polymer having an inherent viscosity of 0.66 was melt spun at 245° C. into fibers. The fibers were drafted in superheated steam at 130° C. with a draw ratio of 4.8 and a draw tension of 1.27 g./denier. The fibers were then heatset for 5 minutes at 145° C. while in a relaxed state. The fibers had the following properties:

| | |
|---|---|
| Inherent viscosity of fiber | 0.64 |
| Denier per fiber | 6.0 |
| Tenacity, g./denier | 4.0 |
| Elongation, % | 28.0 |
| Toughness, g./denier | |
| Calculated | 0.56 |
| Measured | 0.47 |
| Elastic modulus, g./denier | 23.0 |
| Flow point, °C. | 212.0 |
| Liveliness index | 0.37 |

Example 9

Poly(tetramethylene terephthalate) polymer having an inherent viscosity of 0.71 was melt spun at 228° C. into fibers. The fibers were drafted in superheated steam at 130° C. with a draw ratio of 3.9 and a draw tension of 1.60 g./denier. The fibers were then heatset for 5 minutes at 145° C. while in a relaxed state. The fibers had the following properties:

| | |
|---|---|
| Inherent viscosity of fiber | 0.64 |
| Denier per fiber | 5.7 |
| Tenacity, g./denier | 2.70 |
| Elongation, % | 33.0 |
| Toughness, g./denier: | |
| Calculated | 0.45 |
| Measured | 0.50 |
| Elastic modulus, g./denier | 22.0 |
| Flow point, °C. | 216.0 |
| Liveliness index | 0.37 |

Example 10

Poly(tetramethylene terephthalate) polymer having an inherent viscosity of 0.82 was melt spun at 260° C. into fibers. The fibers were drafted in superheated steam at 130° C. with a draw ratio of 4.0 and a draw tension of 1.30 g./denier. The fibers were then heatset for 5 minutes at 145° C. while in a relaxed state. The fibers had the following properties:

| | |
|---|---|
| Inherent viscosity of fiber | 0.79 |
| Denier per fiber | 5.5 |
| Tenacity, g./denier | 3.3 |
| Elongation, % | 37.0 |
| Toughness, g./denier: | |
| Calculated | 0.61 |
| Measured | 0.63 |
| Elastic modulus, g./denier | 21.0 |
| Flow point, °C. | 220.0 |
| Liveliness index | 0.36 |

Example 11

Poly(tetramethylene terephthalate) polymer having an inherent viscosity of 0.95 was melt spun at 260° C. into fibers. The fibers were drafted in superheated steam at 130° C. with a draw ratio of 4.0 and a draw tension of 1.49 g./denier. The fibers were then heatset for 5 minutes at 145° C. while in a relaxed state. The fibers had the following properties:

| | |
|---|---|
| Inherent viscosity of fiber | 0.92 |
| Denier per fiber | 5.7 |
| Tenacity, g./denier | 4.3 |
| Elongation, % | 34.0 |
| Toughness, g./denier: | |
| Calculated | 0.73 |
| Measured | 0.67 |
| Elastic modulus, g./denier | 21.0 |
| Flow point, °C. | 224.0 |
| Liveliness index | 0.36 |

Example 12

Poly(tetramethylene terephthalate) polymer having an inherent viscosity of 1.28 was melt spun at 290° C. into fibers. The fibers were drafted in superheated steam at 120° C. with a draw ratio of 3.9 and a draw tension of 1.70 g./denier. The fibers were then heatset for 5 minutes at 145° C. while in a relaxed state. The fibers had the following properties:

| | |
|---|---|
| Inherent viscosity of fiber | 1.02 |
| Denier per fiber | 5.8 |
| Tenacity, g./denier | 4.9 |
| Elongation, % | 37.0 |
| Toughness, g./denier: | |
| Calculated | 0.91 |
| Elastic modulus, g./denier | 20.0 |
| Flow point, °C. | 227.0 |
| Liveliness index | 0.35 |

Example 13

A polyester having an inherent viscosity of 0.96 was prepared by the melt polymerization of 1,4-butanediol, 95 mole percent of dimethyl terephthalate, and 5 mole percent of dimethyl isophthalate. Fibers were melt spun at 280° C., drafted with a draw ratio of 4.9 (1.13 g./denier draw tension) in hot air at 100° C., and heatset for 5 minutes at 145° C., while being allowed to shrink. The fibers had the following properties:

| | |
|---|---|
| Inherent viscosity of fiber | 0.84 |
| Denier per fiber | 5.8 |
| Tenacity, g./denier | 3.9 |
| Elongation, % | 45.0 |
| Toughness, g./denier: | |
| Calculated | 0.88 |
| Elastic modulus, g./denier | 22.0 |
| Flow point, °C. | 210.0 |
| Liveliness index | 0.38 |

Crimping for the crush recovery test was carried out by heatsetting a knit tube on a frame for 5 minutes, then off the frame for 5 minutes. The fiber was then ravelled from the tube and cut into staple for the test. Its crush recovery was 51.0 percent.

Example 14

A polyester having an inherent viscosity of 1.38 was prepared by the melt polymerization of 1,4-butanediol, 90 mole percent of dimethyl terephthalate, and 10 mole percent of dimethyl azelate. Fibers were melt spun at 280° C., drafted with a draw ratio of 3.7 (1.69 g./denier draw tension) in hot air at 130° C., and heatset for 5 minutes at 145° C. while allowed to shrink. The fibers had the following properties:

| | |
|---|---|
| Denier per fiber | 2.9 |
| Tenacity, g./denier | 4.2 |
| Elongation, % | 31.0 |
| Toughness, g./denier: | |
| Calculated | 0.65 |
| Elastic modulus, g./denier | 20.0 |
| Flow point, °C. | 193.0 |
| Liveliness index | 0.33 |

Crimping for the crush recovery test was carried out by heatsetting a knit tube on a frame for 5 minutes, then off the frame for 5 minutes. The fiber was then ravelled from the tube and cut into staple for the test. Its crush recovery was 62.0 percent.

Example 15

Poly(1,4-tetramethylene terephthalate) with an inherent viscosity of 1.10 was melt spun at 280° C. The fiber was drafted in superheated steam at 140° C. with a draft ratio of 4.7. The fiber was then crimped using 90 psi steam, heatset for 5 minutes at 180° C. while allowed to shrink, and cut into 6-inch staple fibers which had the following properties:

| | |
|---|---|
| Inherent viscosity of fiber | 0.95 |
| Denier per fiber | 15.7 |
| Tenacity, g./denier | 4.1 |
| Elongation, % | 67.0 |
| Toughness, g./denier: | |
| Calculated | 1.37 |
| Measured | 1.40 |
| Elastic modulus, g./denier | 20.0 |
| Liveliness index | 0.27 |
| Crush recovery, % | 60.0 |

A carpet tufted with the staple fibers had excellent recovery and endurance properties. Carpet samples were dyed to deep shades with disperse dyes without a carrier.

Example 16

A polyterephthalate (I.V. 0.82) was prepared which contained units from 1,4-butanediol and ethylene glycol in a 88:12 ratio. Fibers were melt spun at 285° C., drafted with a draw ratio of 4.8 in hot air at 130° C. and heatset for 5 minutes at 145° C., while allowed to shrink. The fibers had the following properties:

| | |
|---|---|
| Inherent viscosity of fiber | 0.76 |
| Denier per fiber | 2.3 |
| Tenacity, g./denier | 3.5 |
| Elongation, % | 30.0 |
| Toughness, g./denier: | |
| Calculated | 0.52 |
| Elastic modulus, g./denier | 22.0 |
| Flow point, °C. | 204.0 |
| Liveliness index | 0.31 |

Crimping for the crush recovery test was carried out by heatsetting a knit tube on a frame for 5 minutes, then off the frame for 5 minutes. The fiber was then ravelled from the tube and cut into staple for the test. Its crush recovery was 51.0 percent.

Example 17

Poly(1,4-tetramethylene terephthalate) with an inherent viscosity of 1.10 was melt spun at 280° C. The fiber was drafted in water at 70° C., (draft ratio 4.5 and draw tension 1.48 g./denier). The fibers were heatset for 5 minutes at 145° C., while allowed to shrink. The fibers had the following properties:

| | |
|---|---|
| Inherent viscosity of fiber | 0.95 |
| Denier per fiber | 15.5 |
| Tenacity, g./denier | 3.7 |
| Elongation, % | 50.0 |
| Toughness, g./denier: | |
| Calculated | 0.92 |
| Elastic modulus, g./denier | 18.0 |
| Flow point, °C. | 225.0 |
| Liveliness index | 0.36 |

When the fibers were drafted in water at 70° C. with a draft ratio of 3.0 (draw tension 0.49 g./denier) and heatset as above, the following tensile properties were obtained:

| | |
|---|---|
| Tenacity, g./denier | 1.9 |
| Elongation, % | 92.0 |
| Elastic modulus, g./denier | 17.0 |
| Toughness, g./denier: | |
| Calculated | 0.88 |

Example 18

Poly(1,4-tetramethylene terephthalate) with an inherent viscosity at 1.28 was melt spun at 290° C. The fiber was drafted in air at 70° C. with a draw ratio of 3.6 (1.29 g./denier draw tension). It was heatset for 5 minutes at 145° C., while held at constant length and then 5 minutes at 145° C., while allowed to shrink. The fibers had the following properties:

| | |
|---|---|
| Inherent viscosity of fiber | 1.03 |
| Denier per fiber | 6.2 |
| Tenacity, g./denier | 4.1 |
| Elongation, % | 37.0 |
| Toughness, g./denier: | |
| Calculated | 0.76 |
| Elastic modulus g./denier | 21.0 |
| Flow point °C. | 226.0 |
| Liveliness index | 0.35 |

Tubes were knit with drafted, unheatset fibers. One tube was placed on a frame, heatset for 5 minutes at 100° C., removed from the frame, and heatset for 5 minutes at 100° C., while being allowed to shrink. The fiber, crimped by this process, was ravelled from the tube and cut into staple for the crush recovery test. The crush recovery was 45 percent. When the tube was heatset as above but at 170° C. instead of 100° C., the crush recovery was 56 percent.

The invention has been described in detail with particular reference to certain preferred embodiments thereof, but it will be understood that variations and modifications can be effected within the spirit and scope of the invention as described hereinabove.

We claim:

1. Textile yarn characterized by improved liveliness, resilience and toughness properties, said yarn comprising oriented, crystalline poly(tetramethylene terephthalate) fibers having a toughness greater than 0.50 g./denier, and a liveliness index greater than 0.25.

2. Textile yarn of claim 1, wherein the fibers are capable of being dyed with disperse dyes without the use of a dye carrier.

3. Textile yarn of claim 1, wherein said fibers have a flow point of at least 216° C.

4. Textile yarn of claim 1, wherein said poly)tetramethylene terephthalate) is derived from at least 85 mole percent of terephthalic acid and up to 15 mole percent of a second dicarboxylic acid containing from three to 20 carbon atoms.

5. Textile yarn of claim 4 wherein said second dicarboxylic acid is selected from isophthalic acid, adipic acid, azelaic acid and 1,12-dodecanedicarboxylic acid.

6. Textile yarn of claim 1 wherein said poly(tetramethylene terephthalate) is derived from at least 85 mole percent of 1,4-butanediol and up to 15 mole percent of a second glycol containing from two to 20 carbon atoms.

7. Textile yarn of claim 6, wherein said second glycol is selected from ethylene glycol, neopentyl glycol and 1,4-cyclohexanedimethanol.

8. Textile yarn of claim 1, wherein the toughness of said fibers is at least 0.60 g./denier.

9. Textile yarn of claim 1, wherein said fibers have a liveliness index of at least 0.30.

10. Textile yarn of claim 3, wherein said fibers have a flow point of at least 220° C.

11. Textile yarn of claim 1, wherein said fibers have a tenacity of at least 3.0 g./denier.

12. Textile fabric having excellent liveliness, resilience and toughness properties, said fabric including yarn comprising poly(tetramethylene terephthalate) fibers, said fibers having a toughness of at least 0.50 g./denier, and a liveliness index greater than 0.25.

13. Textile fabric of claim 12, wherein said fabric is dyed with a disperse dye.

14. Crimped staple textile fiber comprising poly(tetramethylene terephthalate), said fiber having a liveliness index greater than 0.25 and crush recovery greater than 50 percent.

15. Crimped staple textile fiber of claim 14, wherein said fiber is capable of being dyed with disperse dyes without the use of a dye carrier.

16. Crimped staple textile fiber of claim 14, wherein said poly(tetramethylene terephthalate) is derived from at least 85 mole percent of terephthalic acid and up to 15 mole percent of a second dicarboxylic acid containing from three to 20 carbon atoms.

17. Crimped staple textile fiber of claim 16, wherein said second dicarboxylic acid is selected from isophthalic acid, adipic acid, azelaic acid and 1,12-dodecanedicarboxylic acid.

18. Crimped staple textile fiber of claim 14, wherein said poly(tetramethylene terephthalate) polyester is derived from at least 85 mole percent of 1,4-butanediol and up to 15 mole percent of a second glycol containing from two to 20 carbon atoms.

19. Crimped staple textile fiber of claim 18, wherein said second glycol is selected from ethylene glycol, neopentyl glycol and 1,4-cyclohexanedimethanol.

20. Crimped staple textile fiber of claim 1, wherein the toughness of said fiber is at least 0.60 g./denier.

21. Crimped staple textile fiber of claim 1, wherein said fiber has a liveliness index of at least 0.27.

22. Crimped staple textile fiber of claim 1, wherein said fiber has tenacity of at least 3.0 g./denier.

23. A spun textile yarn comprising fibers made from poly(tetramethylene terephthalate), said fibers having a toughness greater than 0.50 g./denier, a liveliness index greater than 0.25, and crush recovery greater than 50 percent.

* * * * *

PO-1050
(5/69)

UNITED STATES PATENT OFFICE
CERTIFICATE OF CORRECTION

Patent No. 3,670,489   Dated June 20, 1972

Inventor(s) Winston J. Jackson, Jr. and Marshall T. Watson

It is certified that error appears in the above-identified patent and that said Letters Patent are hereby corrected as shown below:

Column 1, line 36, between "elongation)" and "200]" insert --- ÷ ---.

Signed and sealed this 30th day of April 1974.

(SEAL)
Attest:

EDWARD M. FLETCHER, JR.
Attesting Officer

C. MARSHALL DANN
Commissioner of Patents